(12) United States Patent
Atluru et al.

(10) Patent No.: US 11,001,291 B2
(45) Date of Patent: May 11, 2021

(54) POWER COLUMN RAKE SLIDER MECHANISM

(71) Applicant: Robert Bosch Automotive Steering LLC, Plymouth, MI (US)

(72) Inventors: Murali Atluru, Farmington Hills, MI (US); Venkateswaran Subramanian, Troy, MI (US); Oliver Perichon, Independence, KY (US)

(73) Assignee: Robert Bosch Automotive Steering LLC, Plymouth, MI (US)

( * ) Notice: Subject to any disclaimer, the term of this patent is extended or adjusted under 35 U.S.C. 154(b) by 83 days.

(21) Appl. No.: 16/349,072

(22) PCT Filed: Nov. 15, 2017

(86) PCT No.: PCT/US2017/061768
§ 371 (c)(1),
(2) Date: May 10, 2019

(87) PCT Pub. No.: WO2018/093876
PCT Pub. Date: May 24, 2018

(65) Prior Publication Data
US 2019/0276067 A1    Sep. 12, 2019

Related U.S. Application Data

(60) Provisional application No. 62/423,372, filed on Nov. 17, 2016.

(51) Int. Cl.
*B62D 1/181* (2006.01)
*B62D 1/187* (2006.01)
(Continued)

(52) U.S. Cl.
CPC .............. *B62D 1/181* (2013.01); *B62D 1/187* (2013.01); *F16H 25/22* (2013.01); *F16H 25/24* (2013.01)

(58) Field of Classification Search
CPC ......... B62D 1/181; B62D 1/187; F16H 25/22; F16H 25/24
(Continued)

(56) References Cited

U.S. PATENT DOCUMENTS 4,878,394 A * 11/1989 Nakamura et al. .... B62D 1/181
74/493
4,900,059 A * 2/1990 Kinoshita etal. ...... B62D 1/181
280/775

(Continued)

FOREIGN PATENT DOCUMENTS

| CN | 101309825 A | 11/2008 |
|----|-------------|---------|
| CN | 101541618 A | 9/2009 |

(Continued)

OTHER PUBLICATIONS

International Search Report and the Written Opinion of the International Searching Authority, dated May 3, 2018; Intl. Appl. No. PCT/US2017/061768.

(Continued)

*Primary Examiner* — Ruth Ilan
(74) *Attorney, Agent, or Firm* — Michael Best & Friedrich LLP

(57) ABSTRACT

A rake adjustment mechanism for an electronically adjustable steering col disclosed.

16 Claims, 4 Drawing Sheets

(51) Int. Cl.
*F16H 25/24* (2006.01)
*F16H 25/22* (2006.01)

(58) Field of Classification Search
USPC .......................................... 280/775; 74/493
See application file for complete search history.

(56) References Cited

U.S. PATENT DOCUMENTS

| | | | |
|---|---|---|---|
| 5,036,720 A * | 8/1991 | Shirasawa et al. | ............................ F16H 25/2006 74/441 |
| 6,637,771 B2 | 10/2003 | Yoshimoto | |
| 7,444,900 B2 * | 11/2008 | Tomaru | .................. B62D 1/181 74/493 |
| 2009/0308189 A1 * | 12/2009 | Tomaru | .................. B62D 1/181 74/89.42 |
| 2015/0375768 A1 | 12/2015 | Fevre et al. | |

FOREIGN PATENT DOCUMENTS

| | | | | |
|---|---|---|---|---|
| CN | 101765533 A | | 6/2010 | |
| CN | 104039628 A | | 9/2014 | |
| CN | 205010305 U | | 2/2016 | |
| DE | 102014104362 A1 | | 10/2015 | |
| EP | 1880917 A1 | | 1/2008 | |
| EP | 2808225 A1 | | 12/2014 | |
| JP | 61067663 A | * | 4/1986 | ............. B62D 1/181 |
| KR | 20050018142 A | | 2/2005 | |
| WO | WO-2017139627 A1 | * | 8/2017 | ............. B62D 1/181 |

OTHER PUBLICATIONS

Chinese Patent Office Action for Application No. 201780070990.8 dated Jan. 8, 2021 (8 pages including statement of relevance).

* cited by examiner

POWER COLUMN RAKE SLIDER MECHANISM

BACKGROUND OF THE INVENTION

The present invention relates to is directed to an adjustable steering column where the rake, or up and down motion of the steering wheel is controlled electronically. In prior adjustable steering columns, a linkage was used to translate the curved or arcuate motion of the pivoting steering column as the rake adjustment was made. Such linkages take up space in an area of the vehicle where space is at a premium. In addition, such linkages are expensive to manufacture and maintain, and have lash or undersirable movement. There is a need in the industry for an electronically adjustable rake mechanism that accommodates the rake adjustment is a smaller space while being easy and cost effective to manufacture.

SUMMARY OF THE INVENTION

A rake adjustment mechanism for an electronically adjustable steering column is disclosed.

Other objects and advantages of the present invention will become apparent to those skilled in the art upon a review of the following detailed description of the preferred embodiments and the accompanying drawings.

IN THE DRAWINGS

DETAILED DESCRIPTION OF THE INVENTION

Figure 1:
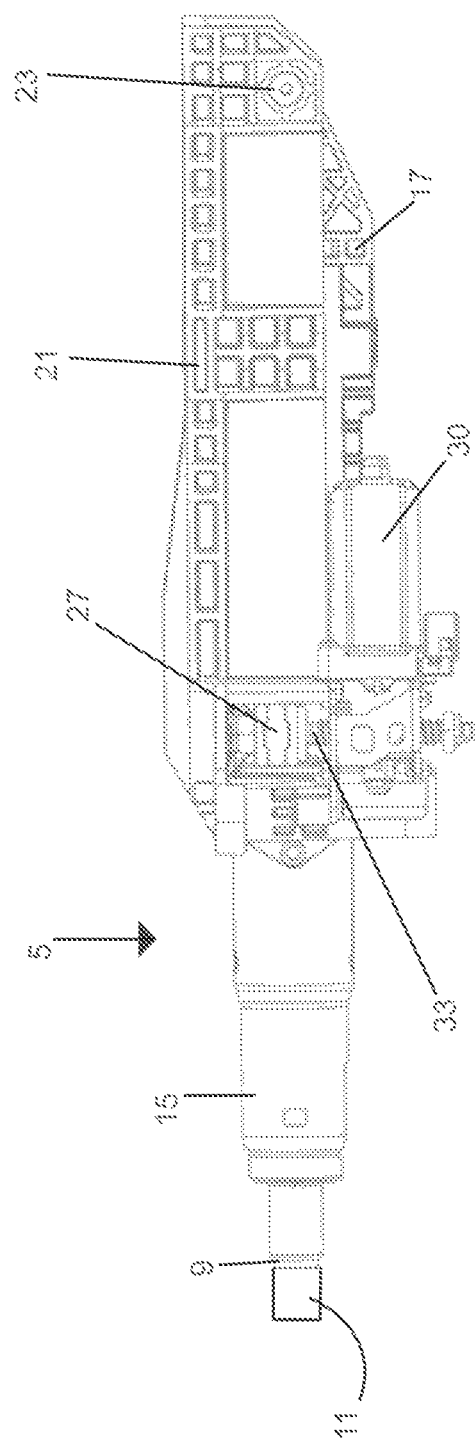
FIG. 1 is a side elevational view showing a side elevational view of the invention.
Figure 2:
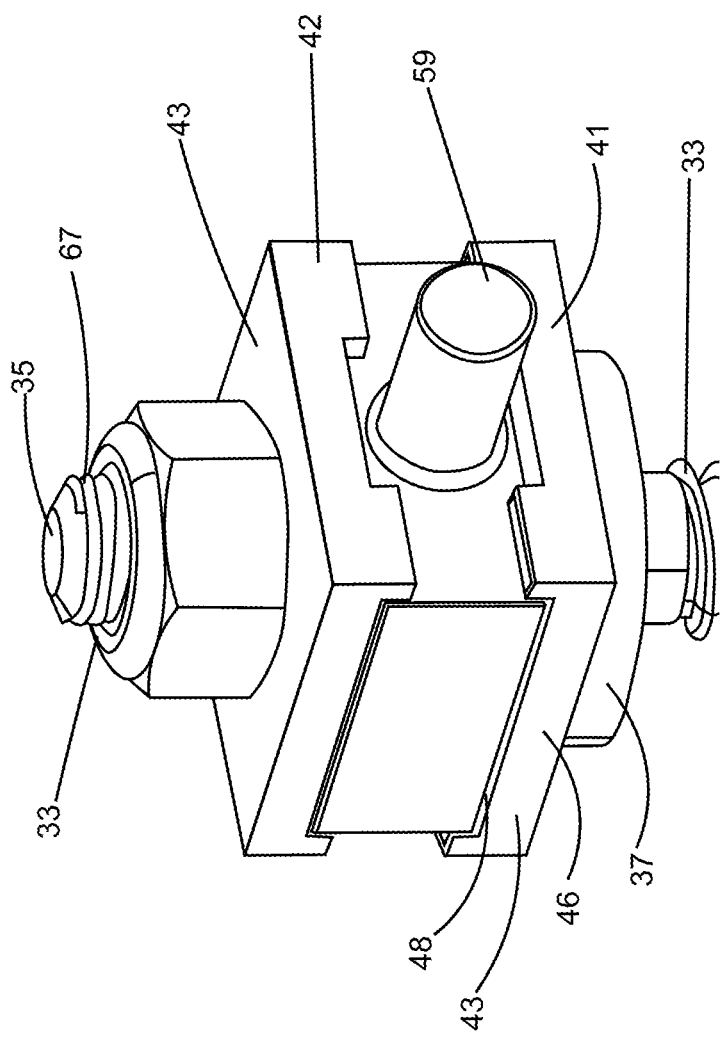
FIG. 2 is a perspective view of the adjustment mechanism of the invention.
Figure 3:
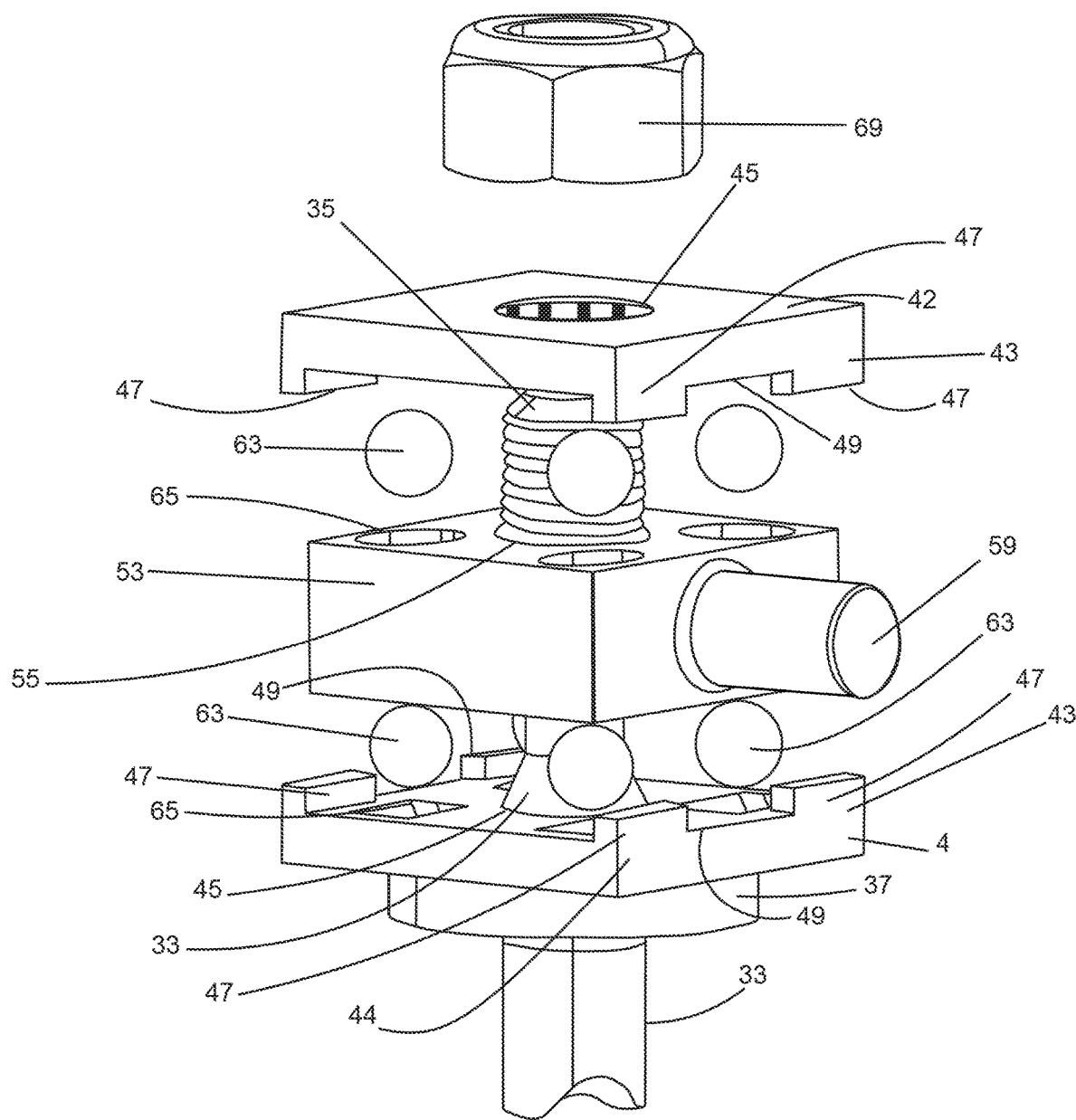
FIG. 3 is an exploded perspective view.
Figure 4:
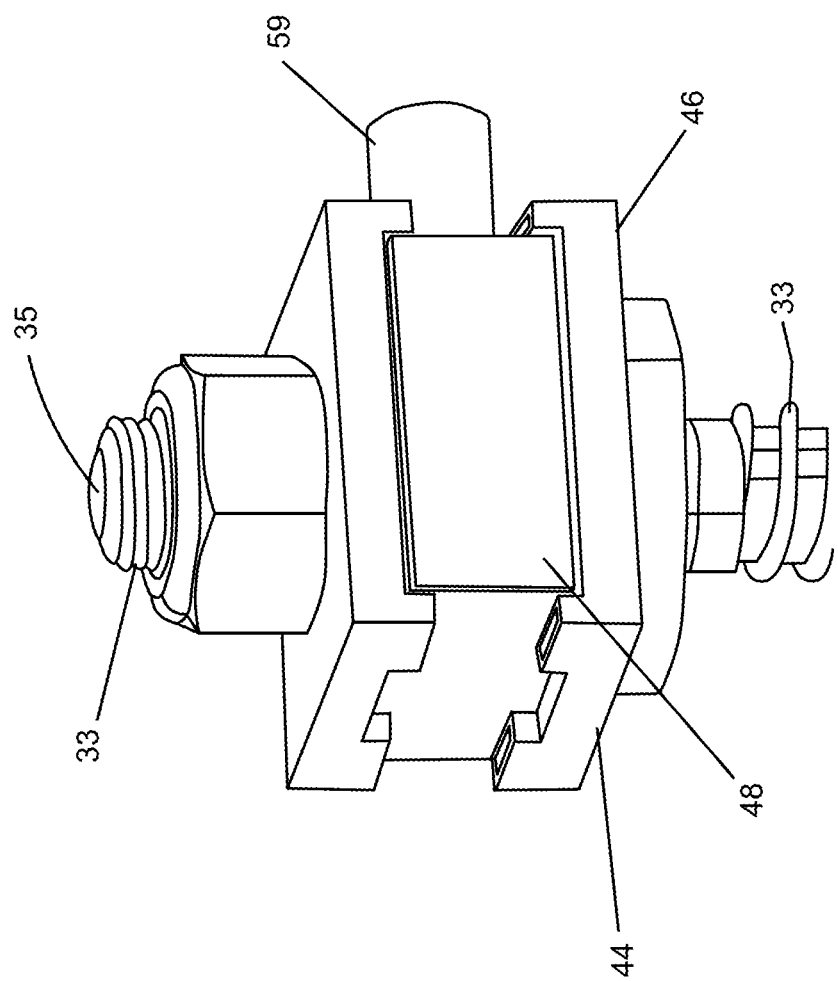
FIG. 4 is a perspective view of the adjustment mechanism.

The invention is directed to a mechanism utilized in the rake adjustment for an adjustable steering column. More particularly the invention is used with a steering column where the rake is electronically adjusted by the user of the vehicle. The invention allows for an essentially linear adjustment mechanism to accommodate a curved or arcuate path for the device that is being adjusted. It should be appreciated that the invention can be used in applications beyond steering columns. The features of the invention will be more readily understood by referring to the attached drawings in connection with the following description.

One of the primary applications of the invention is for use with an adjustable steering column and for the sake of explanation the invention will be described as being used in an adjustable steering column. It should be appreciated, however, that there are many other possible uses for the invention. The adjustable steering column 5 has a shaft 9 having a first end 11. A steering wheel, not shown, is attached to the first end of the shaft 9. The shaft is rotatably positioned in a tube 15. The tube 15 is positioned in a jacket body 17. A roof bracket 21 is secured to the frame of the vehicle. The end of the jacket body that is spaced apart from the end of the shaft 9 where the steering wheel was attached is pivotably connected to the roof bracket 21 by pivot pin 23.

The rake or up and down movement of the adjustable steering column 5 is accomplished by rake drive mechanism 27. The rake drive mechanism includes an electric motor 30 that is operatively connected to a spindle 33. The spindle 33 is disposed so that rotation of the motor 30 will cause the spindle to be displaced in a vertical direction based on the direction of rotation of the motor. An end 35 of the spindle 33 extends along the jacket body 17. A shoulder 37 is positioned on the portion of the spindle 33 that extends from the motor 30 in a direction toward the roof bracket 21. A holder 43 is position on the spindle 33. The holder has a first section 41 and a second section 42. This first and second sections are positioned in opposed spaced apart relationship on the spindle. A first section 41 of a holder 43 is positioned on the spindle adjacent the shoulder 37. The shoulder 37 acts to locate the first section 41 in a desired position on the spindle. An opening 45 is positioned in the first section 41 and second section 42 of the holder so that the spindle 33 can pass through the holder 43. The holder has a press fit on the spindle. On two opposed each sides 44 of the first section 41 of the holder 43 there are two tabs 47 that extend from the side of the first section in a direction away from the shoulder 37. The tabs 47 form a notch 49 in the sides of the first section 41. The tabs 47 form an opening 48 in the sides 46 of the first section. The sides 46 are adjacent to the sides 44 where the notch 49 is located. One of the sides 44 of the first section 41 faces the jacket body 17. A rake slider 53 having a bore 55 is positioned on the spindle 33 adjacent the first section 41 of the holder 43. The rake slider 53 is disposed on the portion of the first section 41 that is spaced apart from the shoulder 37. The bore 55 is disposed in the rake slider to allow the spindle 33 to extend through the rake slider. The bore 55 has a diameter that is from about 20% to about 30% larger than the diameter of the spindle 33. A projection 59 extends from one side of the rake slider 53 in a direction towards the jacket body 17. The projection 59 is disposed so that it is positioned in the notch 49 on the first and second sections. The notch 49 has a width that is from about 30% to about 40% larger than the diameter or width of the projection 59. In most applications, the projection has a cylindrical shape although it should be appreciated that other shapes could be utilized for the projection. The projection 59 is disposed to engage the jacket body 17. The second section 42 of the holder 43 is positioned on the surface of the rake slider 53 that is spaced apart from the first section 41 of the holder 43. Each side 44 of the second section 42 has tabs 47 that extend from the side of the second section to form a notch 49 in the sides 44 in the same manner as the notch 49 on the first section 41 and openings 48 in the sides 46 in the same manner as for the first section 41. The width of the notch 49 and openings 48 on the second section 42 are substantially the same as the width of the notch 49 and openings 48 on the first section 41. One of the sides 44 of the second section 42 faces the jacket body 17. The notches in the second section 42 are in alignment with the notches in the first section 41. The openings 48 are large enough that the sides of the rake slider 53 that face the openings can extend into and through the openings. This allows the rake slider to move laterally in the holder 43 in a direction towards the openings 48. Bearings 63 can be positioned on the surfaces of the first and second sections that engage the rack slider 53. The bearings are positioned in detents 65 that act to locate the bearings in the first and second sections. The bearings have a diameter from about 2 mm to about 8 mm with preferred diameter from about 4 mm to about 6 mm. The bearings allow the rake slider 53 to move more easily with respect to the first and second sections of the holder 43. The end 35 of the spindle 33 extends beyond the second section 42 of the holder 43. Threads 67 are positioned on the end 35 of the spindle and a nut 69 is threadedly positioned on the end 35 of the spindle 33.

In operation a signal is sent to the motor 30 when the operator of the vehicle is interested in changing the rake position of the steering wheel that is mounted on the shaft 9. The rake for the steering wheel is movable in an up and down direction to establish a comfortable position for the operator of the vehicle. As the motor is energized by the signal from the operator, the motor 30 will rotate in the direction that produces the desired adjusting motion for the steering wheel attached to the shaft 9. The rotation of the motor 30 is translated to the spindle 33, in a manner well known in the art, to cause the spindle to move in a direction towards and away from the steering column 5. This movement of the spindle is usually in a vertical direction. The spindle is positioned along the side of the tube 15 that contains the shaft 9. The projection 59 from the rake slider 53 extends in a direction toward the tube 15 and is disposed to engage the tube 15. The movement of the spindle 33 will be translated to the tube 15 by the projection 59. The shaft 9, tube 15 and jacket body 17 all pivot around pivot pin 23 that is attached to the roof bracket 21. Adjusting movement of the steering wheel attached to the shaft 15 will take place around the pivot pin 23. The adjusting motion of the steering wheel and the tube 15 follows an arcuate path that pivots with respect to the pivot pin 23. The motion of the spindle 33 is in a linear, usually vertical, direction that does not follow the arcuate path of the tube 15 as it pivots around the pivot pin 23.

To accommodate the arcuate movement of the shaft 9, the projection 59 is designed to move relative to the first and second sections of the holder 43 that is positioned on the spindle 33 to locate the rake slider 53 from which the projection 59 extends. As the bore 55 in the rake slider 53 is larger in diameter than the diameter of the spindle 33, the rake slider and the projection can move, in a lateral direction towards the opening 48, a sufficient distance with respect to the spindle 33 to accommodate the arcuate motion of the steering wheel as the rake of the steering wheel is adjusted. Bearing 63 can be positioned on the surfaces of the first and second section that are in contact with the rake slider 53 to facilitate the movement of the rake slider relative to the first and second sections of the holder 43. The notch 49 on each of the first and second sections of the holder 43 limit the range of motion for the projection 59 to a level that will accommodate the arcuate motion of the shaft 9 upon which the steering wheel is mounted.

The nut 69 that is positioned on the threads 67 on the end 35 of the spindle 33 can be advanced in a direction towards the second section 42 of the holder 43 to place a biasing force against the second section 42 which will cause the first and second sections of the holder 43 to be biased against the rake slider 53. The biasing force produced by the nut 69 will be sufficient to hold the rake slider in position with respect to the holder 43 until the force of the movement of the tube 15 causes the rake slider to be displaced to accommodate the arcuate movement of the tube 15. The nut 69 is usually a lock style of nut that retains its position on the spindle during operation of the vehicle. The use of a lock nut prevents the loss of clamp load or force during the use of the adjustment mechanism for the steering column. The torque applied to the nut 69 must be sufficient to hold the components in place and to provide a biasing force against the movement of the steering column during adjustment of the steering column. The level of resistance to moving the steering column is selected by the vehicle manufacturer and the current device can accommodate different levels of bias or preload to accommodate the needs of the vehicle manufacturer. The biasing force produced by the nut 69 is from about 100 newton-force to about 2000 newton-force, with a preferred biasing force of from about 800 newton-force to about 1200 newton-force. The biasing force is sufficient to eliminate the looseness or lash in the connection between the rake slider 53, the spindle 33 and the tube 15.

The above detailed description of the present invention is given for explanatory purposes. It will be apparent to those skilled in the art that numerous changes and modifications can be made without departing from the scope of the invention. Accordingly, the whole of the foregoing description is to be construed in an illustrative and not a limitative sense, the scope of the invention being defined solely by the appended claims.

We claim:

1. A motion control device for an adjustable steering column comprising:
   a spindle moveably positioned with respect to the steering column;
   a rake slider having a projection that engages the steering column to moveably adjust the rake position of the steering column; and
   a holder positioned on the spindle for moveably holding the rake slider, the holder having a first section positioned on one side of the rake slider and a second section positioned on the another side of the rake slider in opposed relationship to the first section; tabs extending from the first and second sections adjacent the projection of the rake slider, the tabs forming a control opening that limits the movement of the rake slider,
   wherein a bore extends through the rake slider for receiving the spindle, the bore being larger than the diameter of the spindle to allow movement of the rake slider with respect to the spindle.

2. The device of claim 1, wherein an opening is positioned in the first and second sections of the holder for receiving the spindle.

3. The device of claim 1 wherein a motor is operatively connected to the spindle, the motor being disposed to move the spindle in a linear path, the movement of the spindle changing the position of the steering column.

4. The device of claim 1 wherein an end of the spindle extends from the second section of the holder, the end of the spindle that extends from the second section of the holder having a plurality of threads, a nut disposed on the threads on the end of the spindle, the nut disposed to bias the first and second sections against the rake slider.

5. The device of claim 4, wherein the bore has a diameter that is from about 20% to about 30% larger than the diameter of the spindle.

6. The device of claim 4, wherein a shoulder is positioned on the spindle adjacent the first section, the shoulder holds the first section in a desired position on the spindle.

7. The device of claim 6, wherein there is a bearing on the side of the first and second sections that are adjacent the rake slider.

8. The device of claim 6, wherein the nut biases the first and second sections against the rake slider with a force from about 100 newton-force to about 2000 newton-force.

9. A motion control device for an adjustable steering column comprising:
   a spindle moveably positioned with respect to the steering column;
   a rake slider having a projection that engages the steering column to moveably adjust the rake position of the steering column; and a holder positioned on the spindle for moveably holding the rake slider, the holder having a first section positioned on one side of the rake slider and a second section positioned on the another side of the rake slider in opposed relationship to the first section; tabs extending from the first and second sections adjacent the projection of the rake slider, the tabs forming a control opening that limits the movement of the rake slider, wherein the spindle is secured to the holder, wherein an opening is positioned in the first and second sections for receiving the spindle, and wherein a bore extends through the rake slider for receiving the spindle, the bore being larger than the diameter of the spindle to allow movement of the rake slider with respect to the spindle.

10. The device of claim 9 wherein an end of the spindle extends from the second section of the holder, the end of the spindle that extends from the second section of the holder having a plurality of threads, a nut disposed on the threads on the end of the spindle, the nut disposed to bias the first and second sections against the rake slider.

11. The device of claim 10 wherein the nut biases the first and second sections against the rake slider with a force from about 100 newton-force to about 2000 newton-force.

12. The device of claim 10 wherein a shoulder is positioned on the spindle adjacent the first section, the shoulder holds the first section in a desired position on the spindle.

13. The device of claim 12 wherein there is a bearing on the side of the first and second sections that are adjacent the rake slider.

14. The device of claim 9 wherein the bore has a diameter that is from about 20% to about 30% larger than the diameter of the spindle.

15. The device of claim 9, wherein a motor is operatively connected to the spindle, the motor being disposed to move the spindle in a linear path, the movement of the spindle changing the position of the steering column.

16. The device of claim 9, wherein there is a bearing on the side of the first and second sections that are adjacent the rake slider.

* * * * *